(12) United States Patent
Witte

(10) Patent No.: US 11,491,969 B2
(45) Date of Patent: Nov. 8, 2022

(54) BRAKE SYSTEM FOR DETECTING DEFECTS FOR A TRANSPORTATION VEHICLE, TRANSPORTATION VEHICLE WITH A BRAKE SYSTEM FOR DETECTING DEFECTS, AND METHOD FOR OPERATING A BRAKE SYSTEM FOR DETECTING DEFECTS

(71) Applicant: VOLKSWAGEN AKTIENGESELLSCHAFT, Wolfsburg (DE)

(72) Inventor: Bastian Witte, Groß Schwülper (DE)

(73) Assignee: Volkswagen Aktiengesellschaft

( * ) Notice: Subject to any disclaimer, the term of this patent is extended or adjusted under 35 U.S.C. 154(b) by 311 days.

(21) Appl. No.: 16/685,785

(22) Filed: Nov. 15, 2019

(65) Prior Publication Data
US 2020/0156624 A1 May 21, 2020

(30) Foreign Application Priority Data
Nov. 16, 2018 (DE) ...................... 10 2018 219 652.4

(51) Int. Cl.
*B60W 30/02* (2012.01)
*B60T 7/20* (2006.01)
(Continued)

(52) U.S. Cl.
CPC ............... *B60W 30/02* (2013.01); *B60T 7/20* (2013.01); *B60T 8/1701* (2013.01);
(Continued)

(58) Field of Classification Search
CPC .... B60W 30/02; B60W 10/184; B60W 10/20; B60W 2710/18; B60W 2710/20;
(Continued)

(56) References Cited

U.S. PATENT DOCUMENTS 6,015,193 A * 1/2000 Vogel ...................... B60T 8/321
303/140
9,925,988 B1 * 3/2018 Zwicky ................ B62D 5/0409
(Continued)

FOREIGN PATENT DOCUMENTS

DE 102013017688 A1 4/2014
DE 102013021872 A1 4/2014
(Continued)

*Primary Examiner* — Elaine Gort
*Assistant Examiner* — Ellis B. Ramirez
(74) *Attorney, Agent, or Firm* — Barnes & Thornburg, LLP

(57) ABSTRACT

A brake system for a transportation vehicle, a transportation vehicle having a brake system, and a method for operating a brake system. The brake system has two control units, wherein the respective control unit actuates a respective brake circuit of the brake system, which includes two of four service brakes and one of two electric parking brakes of the brake system. In response to a defect in one of the brake circuits, the control unit of the other brake circuit actuates the respective brakes of the other brake circuit, to carry out trailer combination stabilization of a trailer combination having the transportation vehicle and a trailer coupled to the transportation vehicle; and/or to steer the transportation vehicle in the case of a defect in a steering system of the transportation vehicle based on a steering command of a control device for autonomous driving.

13 Claims, 1 Drawing Sheet

(51) Int. Cl.
*B60T 8/17* (2006.01)
*B60W 10/184* (2012.01)
*B60W 10/20* (2006.01)
*B62D 6/00* (2006.01)
*G05D 1/00* (2006.01)

(52) U.S. Cl.
CPC .......... *B60W 10/184* (2013.01); *B60W 10/20* (2013.01); *B62D 6/00* (2013.01); *G05D 1/0077* (2013.01); *G05D 1/0088* (2013.01); *B60T 2260/09* (2013.01); *B60T 2270/30* (2013.01); *B60T 2270/402* (2013.01); *B60W 2710/18* (2013.01); *B60W 2710/20* (2013.01); *G05D 2201/0213* (2013.01)

(58) Field of Classification Search
CPC . B60T 7/20; B60T 8/1701; B60T 8/88; B60T 8/92; B60T 2260/09; B60T 2270/30; B60T 2270/402; B60T 2201/083; B60T 2230/06; B60T 2270/403; B60T 8/17557; B60T 2270/413; B60T 2270/414; B62D 6/00; G05D 1/0077; G05D 1/0088; G05D 2201/0213
USPC ...... 701/23, 29.2, 31.9; 700/82; 477/4, 9, 25
See application file for complete search history.

(56) References Cited

U.S. PATENT DOCUMENTS

| | | | |
|---|---|---|---|
| 10,137,875 | B2 | 11/2018 | Hecker et al. |
| 2006/0212135 | A1* | 9/2006 | Degoul .................... G05B 9/03 700/20 |
| 2008/0059018 | A1* | 3/2008 | Kueperkoch ...... B60G 17/0185 701/30.3 |
| 2010/0198473 | A1* | 8/2010 | Strengert ............. B60T 17/221 701/70 |
| 2016/0325721 | A1* | 11/2016 | Jonasson ................ B62D 6/003 |
| 2017/0240148 | A1* | 8/2017 | Kotera .................... B60T 1/065 |
| 2018/0229738 | A1* | 8/2018 | Nilsson ................. B60W 10/20 |
| 2020/0148180 | A1* | 5/2020 | Van Thiel .............. B60T 13/62 |
| 2021/0129817 | A1* | 5/2021 | Michels ................. B60T 13/58 |

FOREIGN PATENT DOCUMENTS

| | | |
|---|---|---|
| DE | 102014203322 A1 | 8/2015 |
| DE | 102014214378 A1 | 1/2016 |
| DE | 102014013756 B3 | 2/2016 |
| DE | 102016203093 A1 | 9/2016 |
| DE | 102016221444 A1 | 5/2018 |
| DE | 102017102021 A1 | 8/2018 |
| EP | 2977282 A1 | 1/2016 |
| EP | 3090907 A1 | 11/2016 |
| WO | 2017058707 A1 | 4/2017 |
| WO | 2018188901 A1 | 10/2018 |

* cited by examiner

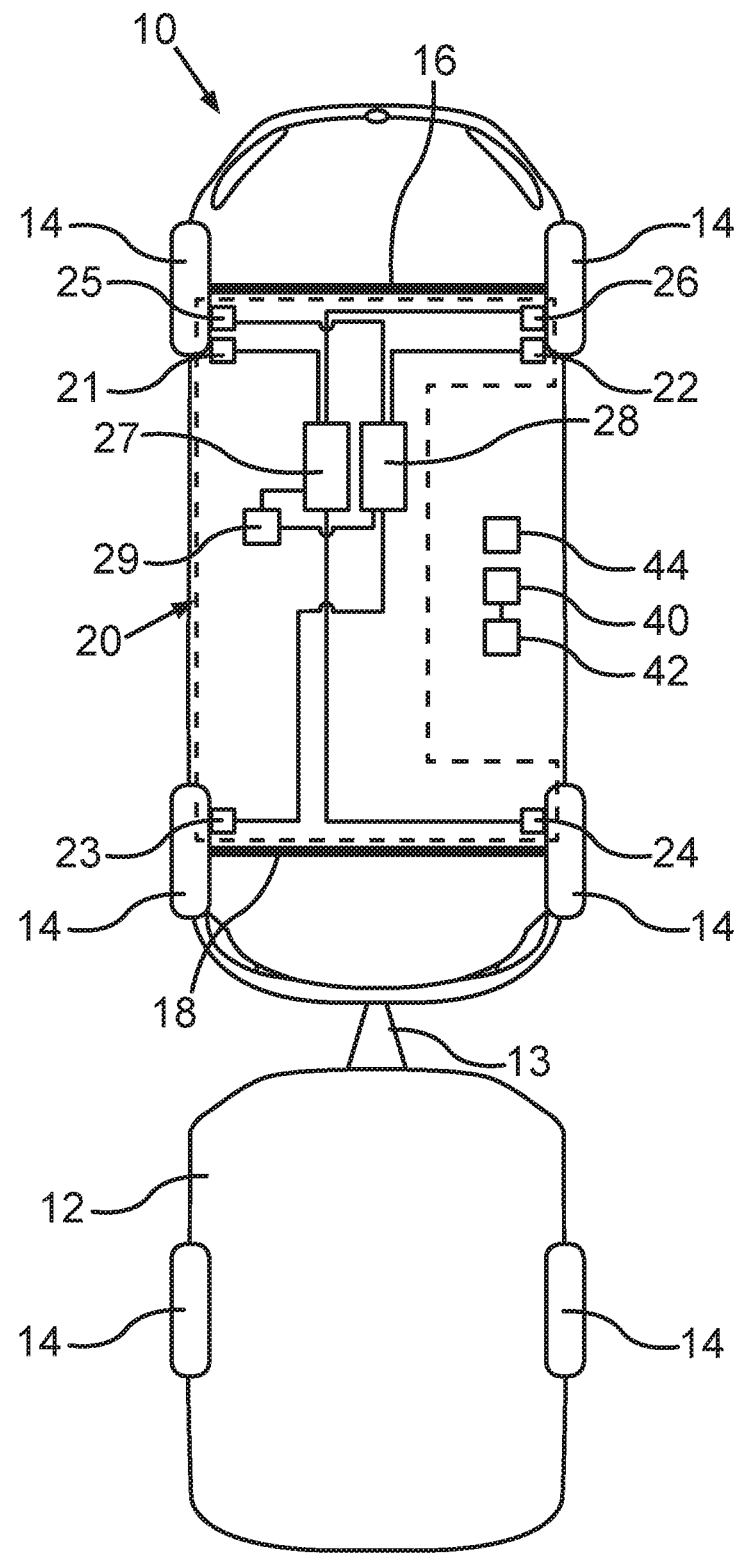

BRAKE SYSTEM FOR DETECTING DEFECTS FOR A TRANSPORTATION VEHICLE, TRANSPORTATION VEHICLE WITH A BRAKE SYSTEM FOR DETECTING DEFECTS, AND METHOD FOR OPERATING A BRAKE SYSTEM FOR DETECTING DEFECTS

PRIORITY CLAIM

This patent application claims priority to German Patent Application No. 10 2018 219 652.4, filed 16 Nov. 2018, the disclosure of which is incorporated herein by reference in its entirety.

SUMMARY

Illustrative embodiments relate to a brake system for a transportation vehicle, to a transportation vehicle having such a brake system, and to a method for operating such a brake system.

BRIEF DESCRIPTION OF THE DRAWINGS

In the single FIGURE, functionally identical elements are provided in each case with the same reference signs.

FIG. 1 shows a transportation vehicle coupled to a trailer.

DETAILED DESCRIPTION

A transportation vehicle usually has respective hydraulic brakes arranged on each of its wheels and nowadays is additionally equipped with electromechanical parking brakes. The electromechanical parking brakes are usually arranged on the rear axle and therefore on the two rear wheels of the transportation vehicle. Here, for example, an electric motor activates a self-locking rotation-translation gear, such as a spindle for example, and thus presses the brake pad of the parking brake against a brake disk. Such electromechanical parking brakes may be configured, for example, such that they are able to be actuated individually for each wheel of the transportation vehicle. However, parking brakes should be used during travel of the transportation vehicle only in the event of an emergency. For example, by the self-locking of the gear, it may be that in the event of a fault, such as a sudden failure of the electrical power supply for example, a built-up braking torque cannot be reduced again and the affected wheel remains firmly braked.

EP 2 977 282 A1 describes a brake system comprising two brake circuits. These two brake circuits each comprise two of a total of four hydraulic brakes of the transportation vehicle, which are each arranged on diagonally arranged wheels of the transportation vehicle. A first brake circuit comprises, for example, the hydraulic brakes, which are arranged on the front left wheel and the rear right wheel of the transportation vehicle, whereas the second brake circuit comprises the respective hydraulic brakes assigned to a front right wheel and a rear left wheel. Each of these two brake circuits is now also assigned one of two electric parking brakes, which may be arranged on one of the two wheels of the rear axle of the transportation vehicle. Here, each brake circuit is assigned that one of the two parking brakes that is arranged on the rear wheel, on which no hydraulic brake of the brake circuit is arranged so far. The respective brakes on three wheels can therefore be actuated using each of the two brake circuits. If, for example, one of the two brake circuits now fails, for example, due to a defect, then a rear wheel of the transportation vehicle assigned to the defective brake circuit can continue to be braked, namely either with the corresponding hydraulic brake or with the electric parking brakes of the other non-defective brake circuit.

DE 10 2014 214 378 A1 describes a brake system for a transportation vehicle, which brake system, similarly to the brake system described in EP 2 977 282 A1, has two brake circuits, which are separate from one another but which each have only two hydraulic brakes and no electric parking brakes.

DE 10 2013 017 688 B4 describes a transportation vehicle having a plurality of wheels, each of which is assigned at least one hydraulically activatable brake. The brakes are assigned to two separate hydraulic brake circuits, wherein both brake circuits are able to be operated via a common brake booster and separately switched on via a valve unit connected downstream of the brake booster. Furthermore, the transportation vehicle has a third and fourth brake circuit parallel to the first and second brake circuit, in each of which an identical valve assembly with assigned control device is provided. The third and fourth brake circuit are able to be connected in the event of a fault in the first and/or second brake circuit.

DE 10 2016 221 444 A1 describes an electronic slip-controllable brake installation for a transportation vehicle. The brake installation has two brake circuits, which are split in parallel, so that one of the brake circuits includes the wheel brakes of the front axle and the respective other brake circuit includes the wheel brakes of the rear axle.

Disclosed embodiments provide a solution by which, in the case of a failure of parts of a brake system of a transportation vehicle, a driving behavior of the transportation vehicle can be influenced in such a way that the transportation vehicle remains in a desired lane.

The disclosure is based on the finding that, for an engagement influencing the driving dynamics by a brake system, for example, in a short-term emergency situation, it is expedient to mount electric brakes, such as electromechanical parking brakes, on the front axle of the transportation vehicle, since braking interventions, for example, for driving stabilization and for driving dynamics influencing, usually take place on the edge external to the curve of the front axle. For example, if a transportation vehicle skids to the left, there will be braking for a short time only using the brake arranged on the front right wheel.

The disclosed brake system for a transportation vehicle has four service brakes each assigned to a wheel of the transportation vehicle, two electric parking brakes assigned to respective wheels of a front axle of the transportation vehicle and two control units. A brake is understood in the context of the disclosure to be a device by which kinetic energy of one of the wheels of the transportation vehicle is converted into thermal energy, wherein the kinetic energy is reduced. This brakes a rotation of the wheel. The four service brakes assigned to the respective wheels may be designed as hydraulically operated brakes. For example, the service brakes may be formed as drum brakes or disk brakes. The two electric parking brakes assigned to the respective wheels of the front axle are designed, for example, as electromechanical parking brakes, that is to say electrically operated brakes. The respective control units are now configured to actuate a respective brake circuit of the brake system. The respective brake circuit comprises two of the service brakes, for example, two hydraulic brakes, and an electric parking brake, wherein each of the brakes of the brake system is actuated by in each case exactly one of the two control units. It is thus possible that, for example, the first brake circuit of the brake system comprises the respective hydraulic brakes, which are arranged on the front left wheel and on the rear right wheel, and the electric parking brake, which is assigned to the front right wheel of the transportation vehicle. In contrast, the second brake circuit of the brake system comprises, for example, the respective hydraulic brakes, which are arranged on a front right and a rear left wheel of the transportation vehicle, and the electric parking brake, which is assigned to the front left wheel. Such brake circuits are implicated, for example, in EP 2 977 282 A1.

In the event of a defect in one of the brake circuits of the brake system, the control unit of the other brake circuit is configured, by actuating the respective brakes of the respective other brake circuit, that is to say by the two respective service brakes and the respective electric parking brake, to carry out the following two functions: On the one hand it is configured, by actuating the respective brakes, to carry out trailer combination stabilization of a trailer combination, wherein the trailer combination comprises the transportation vehicle and a trailer coupled to the transportation vehicle. In trailer combination stabilization, the trailer combination is settled by targeted interventions at least in the brake system of the transportation vehicle and possibly also in an engine management system of the transportation vehicle and the trailer is prevented from breaking away. For this, it is recognized at an early stage by a sensor unit of the transportation vehicle configured for this purpose that an instability of the entrained trailer, that is to say the trailer coupled to the transportation vehicle, exists. Such an instability can occur, for example, due to a speed of the trailer combination not adapted to a lane course or on a slippery road surface. The driving dynamics of the trailer combination of transportation vehicle and trailer can therefore be positively influenced by appropriate actuation of the still functioning brake circuit of the brake system in such a way that a swerving transportation vehicle/trailer combination can be stabilized again. This achieves a situation in which the trailer combination that previously began to swing remains in a prescribed lane.

Additionally or alternatively thereto, on the other hand, the control unit of the other brake circuit, which has no defect, is configured, by actuating the respective brakes of the other brake circuit, to steer the transportation vehicle in the case of a defect of a steering system of the transportation vehicle depending on a steering command of a control device for autonomous driving. What is known as a steering brake can therefore be realized by the brake system. Here, the transportation vehicle is steered by unilateral braking on the wheels, which allows, in particular, in a transportation vehicle with a positive scrub radius, the transportation vehicle to be able to continue to be steered using the brake system in an emergency situation, that is to say, for example, in the case of a defect in the steering system of the transportation vehicle. The brake system serves here so to speak as emergency level for the steering system of the transportation vehicle.

If, for example, the right front wheel of the transportation vehicle is braked and the steering wheel is released here by a driver of the transportation vehicle, then the transportation vehicle continues to be steered to the right. However, this effect occurs only when the transportation vehicle has a positive scrub radius. The scrub radius is generally the distance between a contact point of a steering axle with a lane surface and a ground contact point of the wheel. If a transportation vehicle is braked to a greater extent on one of its sides, it controls this side at which the greater braking force acts. With a positive scrub radius, the braking forces therefore push the wheels outward. The wheel with the greater braking force is thereby further pivoted outward and the transportation vehicle additionally steered in the direction of the side braked to a greater extent. The greater the extent to which braking is effected in such a situation, the greater the steering angle in this direction also becomes. This makes it possible, for example, for a circular course to be able to be traversed completely only by actuating a brake, for example, with a slightly reduced driving speed. In the case of automatic travel, that is to say when the transportation vehicle is steered by corresponding steering commands of the control device for autonomous driving, an additional fallback level in the event of a defective steering system can therefore be realized by the brake system. As a result, an alternative steering system of the transportation vehicle is possible at particularly low cost by the already existing brake system in the transportation vehicle.

Moreover, since the described actuation of the brakes takes place only when a defect has already occurred in one of the brake circuits, this function of the brake system is suitable as a steering brake by corresponding actuation of one of the two brake circuits of the brake system, especially in situations in which already several parts of the transportation vehicle are no longer functional. If no defect occurs in one of the brake circuits of the brake system, the brake system would brake the transportation vehicle, for example, in a manner controlled by a main control unit of the brake system, by actuating, for example, all four hydraulic brakes of the transportation vehicle and/or perform measures to stabilize the handling and influence the driving dynamics.

If, for example, a defect is now detected in the first brake circuit, because there is, for example, insufficient hydraulic pressure in a hydraulic brake, for example, due to a defective hydraulic pump, leakage, power failure, a permanently closed inlet valve or a permanently open outlet valve within the brake circuit, it may be that this first brake circuit is no longer functional. Now, by the brakes of the second brake circuit, that is to say, for example, with the hydraulic brake assigned to the front right wheel and the electric parking brake assigned to the front left wheel, both trailer combination stabilization of a trailer combination and a steering brake, that is to say steering of the transportation vehicle in accordance with the steering commands of the control device for autonomous driving can be realized in the case of a defective steering system. By actuating the respective brakes, it is therefore possible for the transportation vehicle to be actuated in such a way that it remains in a predetermined lane. A travel trajectory of the transportation vehicle therefore remains in a prescribed travel trajectory area. Driving dynamics can therefore be influenced by way of a simultaneously possible interaction of the service brakes, that is to say, for example, the hydraulic brakes, and the electric parking brakes of the transportation vehicle on the front axle.

As an alternative to the actuation of the respective brakes of the other brake circuit in accordance with steering commands of the control device for autonomous driving, it may be provided in the case of driver control that the transportation vehicle in accordance with steering wheel movements of a driver, which, for example, continue to be detected despite a defect in the steering system, corresponding steering commands are identified, in accordance with which the transportation vehicle is steered by corresponding actuation of the respective brakes.

In a disclosed embodiment, it is provided that the control unit of the other brake circuit is configured to actuate the respective brakes depending on a control command from an electronic stability program of the transportation vehicle. An electronic stability program (ESP), which is often also referred to as driving dynamics control system, is an electronically controlled driver assistance system for a transportation vehicle, which counteracts the transportation vehicle breaking away by deliberately braking individual wheels. In addition to the specific trailer combination stabilization of a trailer combination, a further driving stability function, as provided by the electronic stability program, can therefore also be realized by the described brake system. Should the transportation vehicle skid, for example, in a right-hand bend, for example, a braking intervention by the hydraulic brake, which is arranged, for example, on the front left wheel, can then take place for driving stabilization. However, should the transportation vehicle skid in a left-hand bend, then, for example, a braking intervention by the electric parking brake, which is arranged, for example, on the front right wheel, can then take place for driving stabilization. In such a situation, the electric motor of the electric parking brake starts, presses the brake pad by the rotation-translation gear against the brake disk and thus builds up a braking torque on the front right wheel. As a result, a particularly reliable fallback level is realized in the case of a defect in one of the brake circuits, with the result that by the brakes of the brake system it is possible to achieve a situation in which the transportation vehicle not only remains in its lane but is additionally stabilized in its travel.

Alternatively or additionally thereto, the control unit of the other brake circuit can be configured to perform a yaw moment build-up delay, adaptive cruise control and/or traction control (TCS) in the case of a defect in the first of the brake circuits by actuating the respective brakes of the other brake circuit.

According to the disclosure, a transportation vehicle having the brake system described above is also provided. The configuration and the benefits thereof presented in connection with the disclosed brake system correspond accordingly, if applicable, to the disclosed transportation vehicle.

In an exemplary embodiment of the disclosed transportation vehicle, it is provided that the transportation vehicle is configured for autonomous driving. The transportation vehicle for this purpose has a control device for autonomous driving, which is at least configured to actuate a steering process of the transportation vehicle by a steering command. At least one steering process of the transportation vehicle can therefore be carried out fully automatically, that is to say without the intervention of a driver of the transportation vehicle. For an autonomous drive and autonomous braking of the transportation vehicle, further control devices for autonomous driving can be provided in the transportation vehicle, for example.

By the brake system for such a transportation vehicle, it is therefore possible, in the case of a defect in one of the brake circuits, for the control unit of the other brake circuit to be configured to steer the transportation vehicle by actuating the respective brakes of the other brake circuit in the case of an additional defect in the steering system of the transportation vehicle depending on the steering command of the control device for autonomous driving. The transportation vehicle therefore has a further fallback level in the case of a failure of the steering system since then a steering brake can be used to realize that the transportation vehicle remains as far as possible in a current lane or on a current travel trajectory or deviates therefrom to only a minimal extent.

In a further exemplary embodiment of the disclosed transportation vehicle, it is provided that the transportation vehicle has a positive scrub radius on a steerable front axle. At least the wheels of the front axle are thus positioned laterally such that a positive scrub radius results. The scrub radius, that is to say the distance between the point of contact of the steering axle with the road surface and the ground contact point of the wheel, thus lies within a track width of the transportation vehicle. In general, the scrub radius influences the magnitude of a torque on the steering wheel. A low scrub radius relieves the steering linkage of load, since the torque of the scrub radius and friction force at the ground contact point of the wheel is lower than in the case of a greater scrub radius. A transportation vehicle with a positive scrub radius is therefore particularly suitable for realizing a steering brake by actuating individual brakes of the transportation vehicle.

According to the disclosure, a method for operating the brake system described above is also provided, wherein, if one of the two brake circuits of the brake system has a defect, the control unit of the respective other brake circuit actuates the respective brakes of the other brake circuit, that is to say the respective service brakes and the respective electric parking brake. In this case, trailer combination stabilization of a trailer combination comprising the transportation vehicle and a trailer coupled to the transportation vehicle is carried out and/or the transportation vehicle is steered in the event of a defect in a steering system of the transportation vehicle depending on a steering command of a control device for autonomous driving. The configurations and the benefits thereof presented in connection with the disclosed brake system and the disclosed transportation vehicle apply accordingly, if applicable, to the disclosed method for operating the brake system.

The disclosure also provides two control units for the respective brake circuits of the brake system. These control units each have a processor device, which is set up to carry out an exemplary embodiment of the disclosed method. For this purpose, the processor device can have at least one microprocessor or at least one microcontroller. Furthermore, the respective processor device may have a program code, which is set up to execute the exemplary embodiment of the disclosed method when executed by the processor device. The program code may be stored in the data memory of the processor device.

The following text describes an exemplary embodiment of the disclosure. For this purpose, the single FIGURE (FIGURE) shows a schematic illustration of a transportation vehicle having a brake system.

In the exemplary embodiment, the described components of the embodiment each represent individual features of the disclosure, which are to be considered independently of one another and which each also develop the disclosure independently of one another and thus are also to be considered individually or in a different combination than the one shown as part of the disclosure. Furthermore, the described embodiment can also be supplemented by further features that have already been described.

FIG. 1 outlines a transportation vehicle 10, which is coupled to a trailer 12. The transportation vehicle 10 and the trailer 12 thus form a trailer combination. The coupling between the transportation vehicle 10 and the trailer 12 is effected via a trailer coupling 13. The transportation vehicle 10 has four wheels 14, two on a front axle 16 and two on a rear axle 18. The transportation vehicle 10 also comprises a steering system 40, which is configured to steer the transportation vehicle 10, that is to say to actuate corresponding wheel turn angles of the wheels 14. The steering system 40 is actuated here by a control device 42, which is configured for autonomous driving. The transportation vehicle 10 is therefore a transportation vehicle 10 by way of which autonomous travel is possible, that is to say travel without manual driving commands of a driver of the transportation vehicle 10. The transportation vehicle 10 is also distinguished by the fact that at least the steerable front axle 16 of the transportation vehicle 10 has a positive scrub radius. The wheels 14 on the front axle 16 are therefore selected accordingly with respect to tires and rims and arranged on the transportation vehicle 10 in such a way that the transportation vehicle 10 has at least there a positive scrub radius.

The transportation vehicle 10 has a brake system 20, wherein the brake system 20 has four service brakes 21, 22, 23, 24, which are each assigned to one of the wheels 14 of the transportation vehicle 10 and which are formed in this exemplary embodiment as hydraulic brakes 21, 22, 23 and 24, and has two electric parking brakes 25 and 26 assigned to respective wheels 14 of the front axle 16. Here, the hydraulic brake 21 is arranged on the front left wheel 14, the hydraulic brake 22 is arranged on the front right wheel 14, the hydraulic brake 23 is arranged on the rear left wheel 14 and the hydraulic brake 24 is arranged on the rear right wheel 14. The electric parking brake 25 is associated with the front left wheel 14, whereas the electric parking brake 26 is associated with the front right wheel 14. The two electric parking brakes 25 and 26 are therefore assigned to respective wheels 14 of the front axle 16 of the transportation vehicle 10.

In addition, the brake system 20 comprises a main control unit 29 and two control units 27 and 28. The respective control units 27, 28 are each configured to actuate a respective brake circuit of the brake system 20. The respective brake circuit comprises two of the hydraulic brakes 21, 22, 23, 24 and one of the electric parking brakes 25, 26. Here, each of the brakes 21 to 26 of the brake system 20 is able to be actuated by in each case exactly one of the two control units 27, 28. The first brake circuit here comprises the control unit 27 and the hydraulic brakes 21 and 24 and the electric parking brake 26. In contrast, the second brake circuit comprises the control unit 28 and the hydraulic brakes 22 and 23 and the electric parking brake 25.

In the case of a defect, for example, in the first brake circuit, the control unit 28 of the other brake circuit, that is to say of the second brake circuit, is configured, by actuating the respective brakes 22, 23 and 25 of the second brake circuit, to carry out trailer combination stabilization of the trailer combination, comprising the transportation vehicle 10 and the trailer 12 coupled to the transportation vehicle 10 and/or to steer the transportation vehicle 10 in the case of a defect in the steering system 40 of the transportation vehicle 10 depending on a steering command of the control device 42 for autonomous driving. Analogously thereto, the control unit 27 of the first brake circuit is configured, in the case of a defect in the second brake circuit, by actuating the respective brakes 21, 24 and 26 of the first brake circuit, to carry out trailer combination stabilization of the trailer combination and/or to steer the transportation vehicle 10 in the case of a defect in the steering system 40 of the transportation vehicle 10 depending on a steering command of the control device 42 for autonomous driving. If there is no defect in one of the two brake circuits, the four hydraulic brakes 21, 22, 23, 24 and possibly the two electric parking brakes 25, 26, which typically serve as parking brakes, are actuated by the main control unit 29 of the brake system 20.

The control unit 28 of the second brake circuit is also configured to actuate the respective brakes 22, 23 and 25 depending on a control command of an electronic stability program 44 of the transportation vehicle 10. Analogously thereto, the control unit 27 of the first brake circuit is configured to actuate the respective brakes 21, 24 and 26 depending on a control command from the electronic stability program 44 of the transportation vehicle 10 if a defect has occurred in the second brake circuit.

Overall, the example shows how it is possible using the disclosed brake system 20 for a transportation vehicle 10 to achieve a situation in which the driving dynamics thereof are influenced in such a way that the transportation vehicle 10 remains in a lane and, for example, remains in this lane even when driving with the trailer 12 in the case of a swinging trailer combination.

LIST OF REFERENCE SYMBOLS

10 Transportation vehicle
12 Trailer
13 Trailer coupling
14 Wheel
16 Front axle
18 Rear axle
20 Brake system
21, 22, 23, 24 Service brakes, hydraulic brakes
25, 26 Electric parking brakes
27, 28 Control unit
29 Main control unit
40 Steering system
42 Control device
44 Electronic stability program

The invention claimed is:

1. A brake system for a transportation vehicle, the brake system comprising:
   a first brake circuit including a first service brake, a second service brake, and a first electric parking brake arranged on a first front wheel of the transportation vehicle, wherein the first front wheel is located in a first direction away from a central longitudinal axis of the transportation vehicle;
   a second brake circuit a third service brake, a fourth service brake, and a second electric parking brake arranged on a second front wheel of the transportation vehicle, wherein the second front wheel is located in a second direction away from a central longitudinal axis of the transportation vehicle opposite the first direction;
   a first control unit configured to actuate the first brake circuit; and
   a second control unit configured to actuate the second brake circuit,
   wherein:
      in response to a defect in the first brake circuit, the second control unit is configured to actuate the third service brake, the fourth service brake, and the second electric parking brake of the second brake circuit;
      in response to a defect in the second brake circuit, the first control unit is configured to actuate the first service brake, the second service brake, and the first electric parking brake;
      in response to the defect in the first brake circuit and a defect in a steering system of the transportation vehicle, the second control unit is configured to actuate at least one of the third service brake, the fourth service brake, or the second electric parking brake of the second brake circuit so as to steer the transportation vehicle in the second direction; and in response to the defect in the second brake circuit and the defect in the steering system of the transportation vehicle, the first control unit is configured to actuate at least one of the first service brake, the second service brake, or the first electric parking brake of the first brake circuit so as to steer the transportation vehicle in the first direction.

2. The brake system of claim 1, wherein the control unit of the other brake circuit actuates the respective service brakes and the respective electric parking brake based on a control command of an electronic stability program of the transportation vehicle.

3. A transportation vehicle having the brake system of claim 1.

4. The transportation vehicle of claim 3, wherein the transportation vehicle is configured for autonomous driving and comprises a control device for autonomous driving, which is at least configured to actuate a steering system of the transportation vehicle by a steering command.

5. The transportation vehicle of claim 3, wherein the transportation vehicle has a positive scrub radius on a steerable front axle of the transportation vehicle.

6. A method for operating a transportation vehicle brake system, the method comprising:

providing a first brake circuit including a first service brake, a second service brake, and a first electric parking brake arranged on a first front wheel of the transportation vehicle, wherein the first front wheel is located in a first direction away from a central longitudinal axis of the transportation vehicle;

providing a second brake circuit a third service brake, a fourth service brake, and a second electric parking brake arranged on a second front wheel of the transportation vehicle, wherein the second front wheel is located in a second direction away from a central longitudinal axis of the transportation vehicle opposite the first direction;

providing a first control unit configured to actuate the first brake circuit;

providing a second control unit configured to actuate the second brake circuit;

detecting a defect in at least one of the first brake circuit and the second brake circuit, wherein, in response to a defect being detected in the first brake circuit, the second control unit is configured to actuate the third service brake, the fourth service brake, and the second electric parking brake of the second brake circuit, wherein, in response to a defect in the second brake circuit, the first control unit is configured to actuate the first service brake, the second service brake, and the first electric parking brake of the first brake circuit, wherein, in response to the defect in the first brake circuit and a defect in a steering system of the transportation vehicle, the second control unit is configured to actuate at least one of the third service brake, the fourth service brake, or the second electric parking brake of the second brake circuit so as to steer the transportation vehicle in the second direction, and wherein, in response to the defect in the second brake circuit and the defect in the steering system of the transportation vehicle, the first control unit is configured to actuate at least one of the first service brake, the second service brake, or the first electric parking brake of the first brake circuit so as to steer the transportation vehicle in the first direction.

7. The brake system of claim 1, wherein:

in response to a defect in the first brake circuit, the second control unit is further configured to:
  carry out trailer combination stabilization of a trailer combination, wherein the trailer combination comprising the transportation vehicle and a trailer coupled to the transportation vehicle; and in response to a defect in the second brake circuit, the first control unit is further configured to:
  carry out trailer combination stabilization of a trailer combination, wherein the trailer combination comprising the transportation vehicle and a trailer coupled to the transportation vehicle.

8. The brake system of claim 7, further comprising at least one sensor configured to detect an instability of the trailer combination, wherein, in response to a defect in the first brake circuit, the second control unit is further configured to actuating at least one of the third service brake, the fourth service brake, and the second electric parking brake in order to stabilize the trailer combination such that the trailer combination remains in a travel lane in which the transportation vehicle is currently traveling.

9. The brake system of claim 7, further comprising at least one sensor configured to detect an instability of the trailer combination, wherein, in response to a defect in the second brake circuit, the first control unit is further configured to actuating at least one of the first service brake, the second service brake, and the first electric parking brake in order to stabilize the trailer combination such that the trailer combination remains in a travel lane in which the transportation vehicle is currently traveling.

10. The method of claim 6, further comprising:

in response to a defect being detected in the first brake circuit, at least one of:
  carry out trailer combination stabilization of a trailer combination, via the second control unit, wherein the trailer combination comprising the transportation vehicle and a trailer coupled to the transportation vehicle.

11. The method of claim 6, further comprising:

in response to a defect being detected in the second brake circuit, at least one of:
  carry out trailer combination stabilization of a trailer combination, via the first control unit, wherein the trailer combination comprising the transportation vehicle and a trailer coupled to the transportation vehicle.

12. The brake system of claim 9, further comprising:

detecting an instability of the trailer combination via at least one sensor; and in response to a defect being detected in the first brake circuit, actuating, via the second control unit, at least one of the third service brake, the fourth service brake, and the second electric parking brake in order to stabilize the trailer combination such that the trailer combination remains in a travel lane in which the transportation vehicle is currently traveling.

13. The brake system of claim 9, further comprising:

detecting an instability of the trailer combination via at least one sensor; and in response to a defect being detected in the second brake circuit, actuating, via the first control unit, at least one of the first service brake, the second service brake, and the first electric parking brake in order to stabilize the trailer combination such that the trailer combination remains in a travel lane in which the transportation vehicle is currently traveling.

\* \* \* \* \*